United States Patent [19]

Blaudszun

[11] 4,414,003

[45] Nov. 8, 1983

[54] PROCESS AND APPARATUS FOR THE RECOVERY OF SOLVENTS

[75] Inventor: Bernd Blaudszun, Steinkirchen, Fed. Rep. of Germany

[73] Assignee: Lohmann GmbH & Co., KG, Fed. Rep. of Germany

[21] Appl. No.: 319,236

[22] Filed: Nov. 9, 1981

[30] Foreign Application Priority Data

Nov. 7, 1980 [DE] Fed. Rep. of Germany ....... 3042081
Nov. 7, 1980 [DE] Fed. Rep. of Germany ....... 3042082

[51] Int. Cl.$^3$ .............................................. B01D 53/04
[52] U.S. Cl. ............................................ 55/18; 55/28; 55/59; 55/74; 55/161; 55/179; 55/208; 55/387
[58] Field of Search ................... 55/18, 23, 27, 28, 59, 55/62, 74, 75, 161, 179, 180, 208, 387, 389

[56] References Cited

U.S. PATENT DOCUMENTS

| | | | |
|---|---|---|---|
| 1,533,716 | 4/1925 | Voress et al. | 55/59 |
| 2,114,810 | 4/1938 | Ray | 55/62 X |
| 2,345,774 | 4/1944 | Simpson | 55/62 |
| 2,359,660 | 10/1944 | Martin et al. | 55/62 X |
| 2,428,885 | 10/1947 | Luaces | 55/59 X |
| 2,588,296 | 3/1952 | Russell, Jr. | 55/62 X |
| 3,534,529 | 10/1970 | Mattia | 55/62 |
| 3,551,189 | 12/1970 | Gray, Jr. et al. | 117/102 |
| 3,596,438 | 8/1971 | Beukenkamp et al. | 55/59 |
| 4,012,847 | 3/1977 | Rand | 34/75 |
| 4,021,211 | 5/1977 | Turek et al. | 55/18 |
| 4,047,904 | 9/1977 | Worrall | 55/18 |
| 4,104,039 | 8/1978 | Kuri et al. | 55/23 |
| 4,189,848 | 2/1980 | Ko et al. | 34/32 |
| 4,203,734 | 5/1980 | Winter et al. | 55/26 |
| 4,289,505 | 9/1981 | Hardison et al. | 55/59 |

FOREIGN PATENT DOCUMENTS

| | | |
|---|---|---|
| 407179 | 12/1924 | Fed. Rep. of Germany . |
| 455798 | 2/1928 | Fed. Rep. of Germany . |
| 542991 | 1/1932 | Fed. Rep. of Germany . |
| 600086 | 7/1934 | Fed. Rep. of Germany . |
| 224826 | 7/1976 | Fed. Rep. of Germany . |

OTHER PUBLICATIONS

"Die aktive Kohle, ihre Herstellung und Verwendung" (Ergänzungsband) 1932, Verlag von Wilhelm Kanpp, Halle (Saale), pp. 120–125.

"Adsorption von Gasen und Dämpfen in Laboratorium und Technik," 1944, Verlag von Theodor Steinkopff (Dresden und Leipzig), published in Technische Fortschrittsberichte, vol. 49 of the same publisher, pp. 164 to 166.

*Primary Examiner*—Robert H. Spitzer
*Attorney, Agent, or Firm*—Webb, Burden, Robinson & Webb

[57] ABSTRACT

A process and an apparatus for the recovery of solvents adsorbed from exhaust air containing solvent vapors by an adsorbent is disclosed. A stream of hot inert gas is made to pass preferably, in an alternating manner through two absorbent charges laden with solvent to achieve desorption. The solvent vapors picked up by the stream of inert gas are condensed and separated. The stream of inert gas, lean in solvent vapors, is used as a desorption medium.

27 Claims, 5 Drawing Figures

PROCESS AND APPARATUS FOR THE RECOVERY OF SOLVENTS

BACKGROUND OF THE INVENTION (1) Field of the Invention

This invention relates to the recovery of solvents which are absorbed on an adsorbent from exhaust air containing solvent vapors.

(2) Description of the Prior Art

Process and apparatus for recovering solvents are known (see, e.g., Ullmans Encyklopädie der technischen Chemie 4th Edition, 1972, Vol. 2, page 613).

The best known process for solvent recovery operates with granular active carbon in a fixed bed in vertical or horizontal adsorbers. The carbon is regenerated with steam as the desorption medium, which flows through the adsorber counter to the loading direction. After the treatment with hot steam, the adsorber is dried with air and cooled. For cooling, the exhaust air laden with solvent vapors can be used, i.e., the process of drying and cooling can be coupled with loading.

Desorption of the adsorbent with steam has certain disadvantages, however.

In the first place, the energy required to generate the steam cannot be recovered. Further energy, in the form of hot air, is required for drying the adsorbent. Certain adsorbents, such as silica gel or molecular sieves, are very hard to dry at all. When active carbon is used as adsorbent, the drying air must not be too hot in order to prevent self-ignition of the active carbon or of the solvent residues still adsorbed on it. On the other hand, if considerably cooler air is used the required drying time is prolonged.

A further disadvantage is that the recovered solvents have to be separated from the steam, which is of considerable difficulty when the solvents are water soluble and their boiling points lie near that of water. In this case, an expensive rectification plant is necessary for the separation.

Furthermore, certain solvents, in some circumstances because of the catalytic action of the adsorbent, react with steam or with the hot drying air; e.g., in the case of chlorinated hydrocarbons, hydrogen chloride is liberated and causes corrosion in the plant.

The object of the present invention is to provide a process and an apparatus of the type defined above, by means of which the solvents can be desorbed and separated from the desorbent in a simple and easily controllable manner, with a considerably lower expenditure of energy, and without decomposition phenomena.

BRIEF DESCRIPTION OF THE INVENTION

The invention is based on the general concept of carrying out the desorption by means of an inert gas stream conducted in a circuit and of condensing the solvent vapors out of the inert gas stream.

The process according to a first embodiment of the invention is specially characterized in that, after displacement of the exhaust air surrounding the adsorbent, a hot inert gas stream is conducted, as desorbent, through the adsorbent, the solvent vapors taken up by the inert gas stream are condensed out by cooling, the solvent condensate is separated, and in inert gas stream lean in solvent vapors is re-used for desorption after being reheated.

The apparatus according to the first embodiment of the invention is characterized by at least one adsorbent vessel provided with inlet ducts and outlet ducts for alternately conducting a cold exhaust gas steam laden with solvent vapors or an inert gas stream lean in solvent vapors through it; at least one cooling device connected to the outlet duct of the inert gas stream laden with solvent vapors in the adsorbent vessel; and at least one apparatus, following the cooling device(s) and connected to the inlet duct to the adsorbent vessel, to reheat the cooled inert gas stream lean in solvent vapors.

The process according to a second embodiment of the invention is characterized in that after the exhaust air surrounding the adsorbent is displaced, a hot, inert gas stream lean in solvent vapors is alternately conducted, as the desorption medium, through two charges adsorbent laden with solvent, the solvent vapors taken up by the inert gas stream are condensed out by cooling, the solvent condensate is separated, and the inert gas stream lean in solvent vapors, after being reheated, is used again for desorption, the respective adsorbent charge depleted of desorption being taken out of the inert gas circuit and again laden with solvent from the cold exhaust air laden will solvent vapors.

The apparatus according to the second embodiment of the invention is characterized by two vessels for desorption medium, of which vessels alternately one, the adsorbent of which is laden with solvent, is inserted into the inert gas circuit lean in solvent vapors and the other, the adsorbent of which is depleted of solvent, is removed from the inert gas circuit and inserted into a cold exhaust air stream laden with solvent vapors; a cooling apparatus connected to the outlet duct of the one vessel for adsorbent, with a following solvent separator for removal of the solvent vapors contained in the inert gas stream after the one adsorbent vessel; and an apparatus following the solvent separator and connected to the inlet duct to the one adsorbent vessel for reheating the cooled inert gas stream lean in solvent vapor.

DETAILED DESCRIPTION OF THE INVENTION

The recovery of solvents according to the invention can be utilized in various industries, e.g., the printing and paper industries, the lacquering and packaging industries, the synthetic fiber industry, the explosives industry, the artificial leather industry, and also in the rubber and asbestos industries.

Solvents which can be recovered by means of the process according to the invention, are, for example, such as those based on liquid hydrocarbons, halogenated hydrocarbons, alcohols, ethers, ketones, esters and the like. Besides these solvents in the proper sense, there can also be separated from air or other gases substances which are primarily to be regarded as injurious materials or which cause odor pollution. Many of these materials, e.g., certain sulfur compounds such as mercaptans, cannot in fact be used as solvents; they can, however, be used in other ways, e.g., as starting materials or intermediate products in chemical syntheses.

The process according to the invention can be carried out with the most diverse adsorbents. Active carbon is chiefly used as the adsorbent. In addition to active carbon, other adsorbents can be used, such as silica gel and molecular sieves, which can be regenerated only with difficulty, or not at all, by the known steam desorption process. Since, according to this invention, the inert gas is circulated in a circuit and cools and condenses out not only the solvent vapors but also the water vapor entrained with the exhaust air, a dry inert gas stream is always available for desorption and for regeneration of the adsorbent, so that the adsorptivity of the adsorbent is not impaired by water vapor. Even substances which are corrosive in the presence of water, such as hydrogen chloride, are far less active when contained in a dry stream of inert gas and are condensed out of the inert gas stream on each pass. Nitrogen or carbon dioxide is preferably used as the inert gas. However, the oxygen content of the air can also be reduced by admixture of an inert gas to the extent that the ignition limit of the solvent vapors is no longer reached. In certain cases it is also possible to use combustion exhaust gases with a low oxygen content as the inert gas. The permissible oxygen content of the inert gas depends, among other things, on the concentration and the nature of the solvent vapor. Thus, for example, the danger of ignition is greater with low-boiling hydrocarbons and ethers than with halogenated hydrocarbons. The ignition properties of various solvent vapors are known, however, and the permissible solvent vapor concentrations and oxygen contents can be taken from the literature or determined by simple tests.

The process according to the present invention is distinguished by a particularly low energy requirement, due to the fact that no heat of evaporation needs to be supplied to the inert gas, in contrast to the stream hitherto used as desorbent.

A further improvement of the energy balance by means of a process in accordance with the first embodiment of the present invention is obtained by compressing and cooling the inert gas stream laden with solvent vapors in an expansion turbine with the production of work. This may be preceded by a precooling of the gas stream. The condensation of the solvent vapors by the expansion of a compressed inert gas stream also makes possible the use of compact heat exchangers.

The expansion turbine is preferably preceded by at least one compressor in which the inert gas stream is precompressed. The expansion turbine is preferably preceded by cooling devices in order for the input temperature of the inert gas stream to be not too high. The work derived from the expansion turbine is preferably directly used for compressing the inert gas stream laden with solvent vapors, with the expansion turbine mechanically coupled to a compressor. The mechanical coupling is preferably direct, i.e., without a special gearing.

The inert gas stream laden with solvent vapors is preferably compressed in at least two stages, i.e., with the use of at least two compressors, and is cooled in at least one intermediate stage by means of an intermediate cooler. The last compressor is driven in mechanical coupling with the expansion turbine, e.g., a high pressure compressor directly mechanically coupled thereto, while the remaining compressors are driven by externally supplied work, e.g., by an electric motor. The cooling of the expansion turbine to the last compressor is thus rigid (i.e., no gearing is required), while the required regulation of the pressure in the inert gas circuit is effected by means of the external work machine, which is coupled in the usual manner via gearing to the first compressors.

The inert gas stream laden with solvent vapors emerges from the respective adsorbent vessel at a substantially high temperature and is cooled before entry into the first compressor. This can be done in a simple manner by indirect heat exchange with the exhaust air lean in solvent vapors, which is quite cold when it leaves the other adsorbent vessel. For this purpose, an indirect heat exchanger is inserted in the hot inert gas stream laden with solvent vapors and the cold exhaust air lean in solvent vapors flows through it.

After passing through the expansion turbine, the inert gas stream laden with solvent vapors is cooled to an extent such that the solvent condenses and can be separated in a solvent separator. The cooled inert gas stream lean in solvent vapors can now be used for indirect cooling of the compressor inert gas stream laden with solvent vapors; this is arranged, as regards apparatus, by insertion of a heat exchanger between the second compressor and the expansion turbine in the inert gas stream laden with solvent vapors, with the cold inert gas stream lean in solvent vapors flowing therethrough. In this way, on the one hand, the required cooling of the inert gas stream laden with solvent vapors is achieved after the expansion turbine, and on the other hand, the inert gas stream lean in solvent vapors is reheated. A further heating of the inert gas stream lean in solvent vapors can be done by means of a second indirect heat exchanger through which the inert gas stream laden with solvent vapors and the inert gas stream leaving the first compressor flow. The inert gas stream lean in solvent vapors can finally be brought to the temperature required for desorption of the solvent adsorbed on the adsorbent by means of a heater before entry into the adsorbent vessel.

The hot inert gas stream lean in solvent vapors is conducted through at least two adsorbent charges laden with solvent; the respective adsorbent charge depleted of solvent by desorption is taken out of the inert gas circuit and reloaded with solvent from the cold exhaust air laden with solvent vapors. For this purpose, at least two adsorbent vessels are provided, of which, alternately, the first one, the adsorbent of which is laden with solvent, is inserted into the circuit for inert gas lean in solvent vapors, and the second, the adsorbent of which is depleted in solvent, is switched out of the inert gas circuit and inserted into a stream of cold exhaust gas laden with solvent vapors.

Since the exhaust air in contact with the adsorbent must be prevented from getting into the inert gas circuit, a portion of the inert gas stream contaminated with the exhaust air is taken out of the circuit in the initial phase of the desorption of the first adsorbent charge. Since this gas mixture contains solvent vapors, it is appropriately not conducted into the atmosphere, but into the second adsorbent charge, which is depleted of solvent. For this purpose, the first adsorbent vessel is provided with an outlet duct leading to the second adsorbent vessel and through which a portion of the inert gas circuit stream containing solvent vapors is conducted into the second adsorbent vessel at the beginning of desorption. The solvent vapors are adsorbed there, and the gas mixture is conducted into the atmosphere.

Certain losses of inert gas arise from this "inert gas flushing" of the adsorbent vessel and are appropriately compensated by feeding fresh inert gas into the inert gas circuit. For this purpose an inert gas source, e.g., a pressure container of nitrogen, is inserted into the inert gas circuit. The inert gas circuit is also required when the apparatus is to be inertized on starting up or when other leakage losses may arise during operation. The inert gas source appropriately has a control valve, which is coupled to a device in the inert gas circuit for measuring oxygen concentration. The control valve is actuated when the oxygen concentration in the inert gas circuit rises above the permissible value. This value is dependent on the nature and concentration of the solvent vapor.

Further devices for measuring the oxygen concentration can be provided on the outlet ducts of the adsorption vessels, in order to determine whether the inerting of the adsorbent vessels is completed in the initial phase of desorption, i.e., the exhaust air as first contained in the adsorbent vessel has been displaced, so that the desorption stream can be again conducted into the inert gas circuit. These devices for measuring oxygen concentration are appropriately coupled to corresponding control valves. Heating of the inert gas stream appropriately first occurs after ending the inerting of the respective adsorbent vessel.

The adsorbent vessel switched to adsorption at a particular time, i.e., the vessel in the stream of exhaust air laden with solvent vapors, can be provided at its outlet duct with devices for determination of the solvent vapor concentration, in order to detect breakthrough of solvent vapors. Such a device can be in the simplest case, for example, a cold trap, in which the breakthrough of solvent vapor becomes evident from condensate formation.

Breakthrough of solvent vapors can furthermore be detected spectroscopically. The detecting device can also be coupled to a control valve in order to automatically change the adsorbent vessel over to inerting.

In accordance with the second embodiment of the invention, the inert gas circuit can be operated at substantially normal pressure, i.e., only a fan needs to be provided in the inert gas circuit to overcome the flow resistance of the individual parts of the equipment. However, a further improvement of the energy balance can be obtained by compressing the solvent-laden inert gas stream, possibly after precooling, and cooling it in an expansion turbine under load. The condensation of the solvent vapors by expansion of a compressed inert gas stream also makes possible the use of compact heat exchangers.

The compression of the solvent-laden inert gas stream can take place in several stages, coolers or heat exchangers being arranged between the individual compressor stages. The expansion turbine can be directly coupled to a compressor, while the remaining compressors can be coupled to an external load machine such as an electric motor. The solvent-laden inert gas stream is cooled very strongly in the expansion turbine under load, the solvent vapors being condensed out practically completely and being able to be separated in a solvent separator. The cooled inert gas stream lean in solvent vapors can be used for indirect cooling of the compressed inert gas stream laden with solvent vapors; this is solved as regards apparatus by insertion of a heat exchanger, through which the cooled inert gas stream lean in solvent vapors flows, between the last compressor and the expansion turbine in the stream of inert gas laden with solvent vapors. In this manner, on the one hand, the required cooling of the inert gas stream laden with solvent vapors is obtained and, on the other hand, the inert gas stream lean in solvent vapors is reheated. A further heating of this inert gas stream to the temperature required for desorption of the solvent adsorbed on the adsorbent is effected by means of a heating register.

Simple control of the loading and desorption process is possible by means of the invention, i.e., the process works practically continuously, without interruption of the course of operation.

In order to avoid exceeding the capacity of the respective adsorbent charge in the loading phase, it is appropriate to measure in this phase the solvent vapor concentration in the exhaust air which has passed through the adsorbent charge, the desorption phase being initiated after a predetermined concentration value is reached. Breakthrough of solvent vapors is thus prevented, so that cleaned exhaust air always reaches the atmosphere. The solvent vapor concentration can be measured with solvent vapor detectors; such a detector can, in the simplest case, be a cold trap in which breakthrough of the solvent vapor is evidenced by condensate formation.

Furthermore, breakthrough of solvent vapors can be determined spectroscopically. The solvent vapor detectors can be provided with elements for control of changeover valves or with switching devices which effect heating of the inert gas stream after changeover of the valves.

Since the exhaust air in contact with the adsorbent must be prevented from entering the inert gas circuit during changeover from adsorption (loading) to desorption, the oxygen content of the inert gas stream contaminated with exhaust air is measured at the beginning of the desorption phase and the adsorbent charge is inserted into the inert gas stream again only after the value falls below the maximum permissible oxygen concentration.

Since the inert gas stream contaminated with exhaust air and with an oxygen concentration still above the maximum permissible value still contains solvent vapors, it is appropriately not conducted into the atmosphere but into the other adsorbent charge, which is depleted of solvent. For this purpose there is provided an adsorbent medium vessel with an outlet duct leading to the other adsorbent vessel and through which a portion of the inert gas circuit stream which is contaminated with exhaust air and which contains solvent vapors is conducted into the other adsorbent vessel at the beginning of the desorption phase. The solvent vapors are adsorbed there and the gas mixture is conducted away into the atmosphere.

To measure the oxygen concentration in the exhaust air or in the inert gas contaminated with exhaust air, oxygen detectors are provided in the outlet ducts of the adsorbent vessels and can be provided with elements for controlling changeover valves or with switching devices by means of which the heating or cooling of the adsorbent charges and, hence, of the exhaust air or the inert gas stream can be achieved.

Losses of inert gas arise from the displacement of the exhaust air surrounding the adsorbent (inert gas flushing or inerting of the adsorbent vessel), and are appropriately compensated for by feeding dry inert gas into the inert gas circuit. An inert gas source, e.g., a pressure container of nitrogen, can be inserted into the inert gas duct for this purpose. The inert gas source is also necessary when the apparatus is to be inertized on the start-up or when other leakage losses occur during operation. The inert gas source is appropriately controllable by an oxygen detector inserted in an outlet duct of an adsorbent vessel. The inert gas source can be provided with a control valve for this purpose. This is actuated when the oxygen concentration in the inert gas circuit rises above the permissible value which depends on the kind and concentration of solvent vapor.

Heating of the inert gas stream appropriately occurs only after the end of the inerting of the respective adsorbent vessel, i.e., the inert gas stream is conducted, at a lower temperature than required for desorption, into the respective solvent-depleted adsorbent charge at the beginning of the desorption phase. The required desorption temperature is conveniently set automatically when the oxygen concentration falls below the maximum permissible value, with the oxygen detector arranged in the respective outlet duct controlling the switching devices for heating the inert gas stream.

If the exhaust air contains a mixture of solvent vapors, as is the case when solvent mixtures are used, a fractional desorption can be carried out by increasing the desorption temperature stepwise. In this manner, the pure solvent fractions are recovered or undesired components, which would cause trouble during re-use of the solvent, can be removed. Examples of these undesired components are water, which is contained in the exhaust gas stream as water vapor, or solvent decomposition products such as hydrogen chloride. When active carbon is used as the adsorbent, these impurities are desorbed at lower temperatures than the solvent and can be condensed out and removed before the solvent.

The stepwise increase of desorption temperature is preferably carried out automatically, control by means of solvent vapors being appropriately effected. When the detectors operate on the spectroscopic principle, the signals from different spectral regions which are characteristic of the respective solvent vapors can be used for temperature control. Detectors can furthermore be used which work on the principle of the different thermal conductivity of the individual solvent vapors.

When desorption of an adsorbent charge is ended, this charge is again loaded with solvent. In order to determine the right time to change between desorption and adsorption, preferably the solvent vapor concentration is measured in the inert gas stream which has passed through the adsorbent charge, and the loading phase is initiated after a predetermined concentration value is reached. Measurement of the solvent vapor concentration is preferably carried out with solvent vapor detectors which work either on the spectroscopic principle or on the principle of the thermal conductivity of the inert gas used as carrier gas. When the solvent vapor detectors can no longer detect solvent vapors, switching devices are actuated by a control signal to automatically lower the temperature of the adsorbent charge, e.g., a heating register in the inert gas stream may be switched off.

The adsorbent charge can then be inserted into the cold inert gas circuit after a certain time, since the desorption of the one adsorbent charge is in general completed in a shorter time than the loading of the other adsorbent charge. On changeover the desorbed adsorbent charge is thus completely cooled, so that it can be optimally loaded again when placed in the exhaust air stream laden with solvent vapors.

DETAILED DESCRIPTION OF THE DRAWINGS

Figure 1:
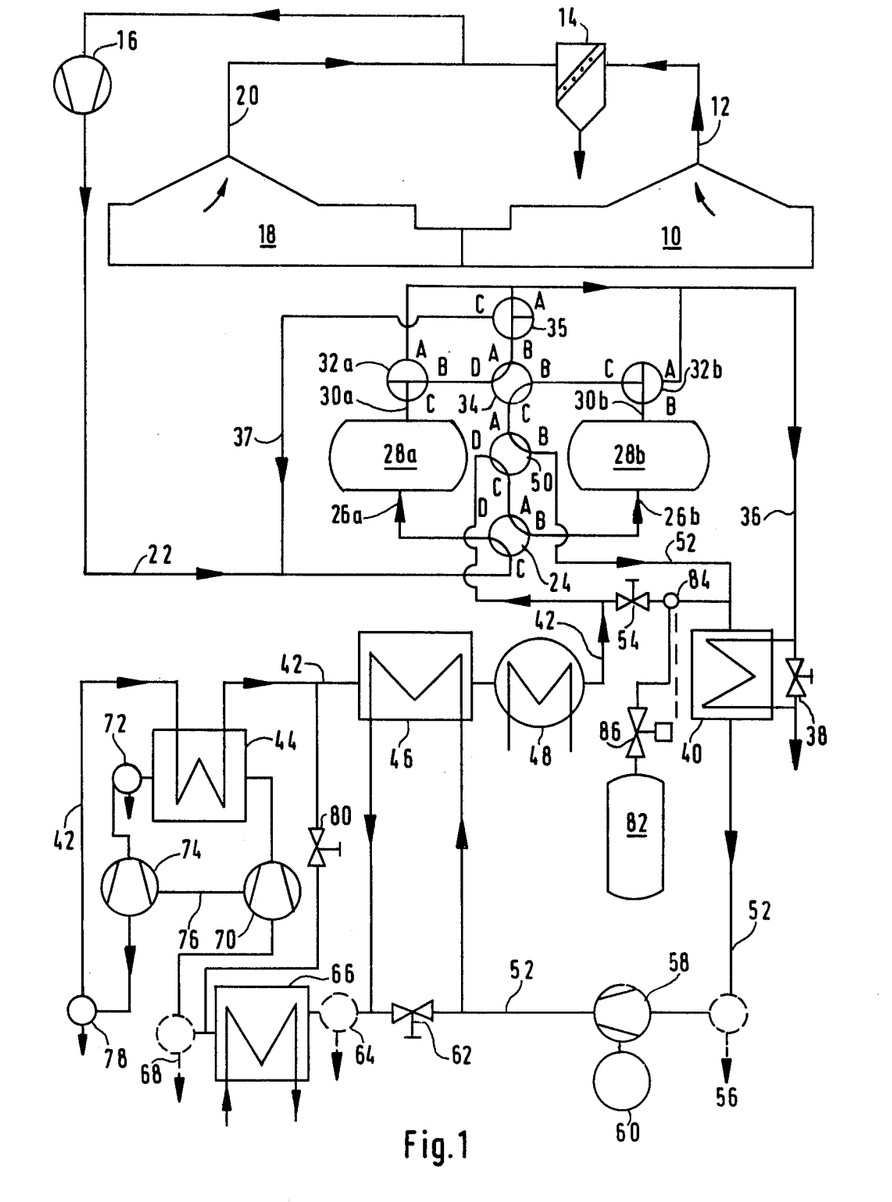
FIG. 1 is an overall schematic view of a solvent recovery apparatus in accordance with the first embodiment of the present invention in the operating state, in which the first adsorbent vessel is switched to adsorption and the second adsorbent vessel is switched to desorption.

As shown in FIG. 1, articles to be lacquered are brought into the lacquering space 10, which is provided with a take-off duct 12. The exhaust air laden with solvent vapors and solid lacquer particles are conducted by means of the exhaust air fan 16 through the solids separator 14, which is provided with a filter. After lacquering, the articles are brought into the drying space 18 and the exhaust air laden with solvent vapors is sucked out of the drying space 18 via the take-off duct 20 by means of the exhaust air fan 16.

Figure 2:
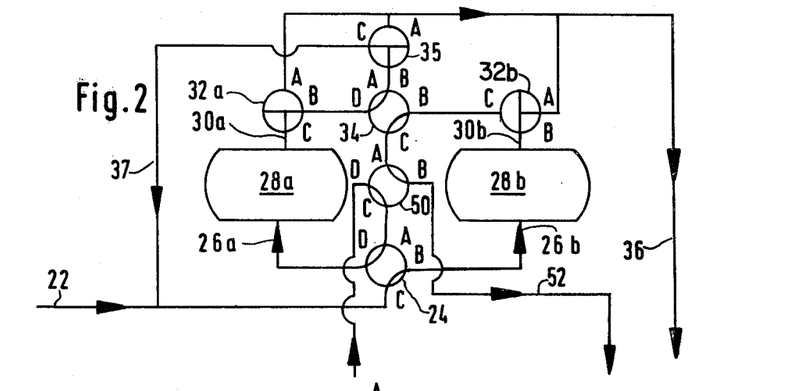
FIG. 2 is a schematic view of a portion of the apparatus of FIG. 1 in the operating state, in which the first adsorption vessel is inerted and the second vessel is switched to adsorption.
Figure 3:
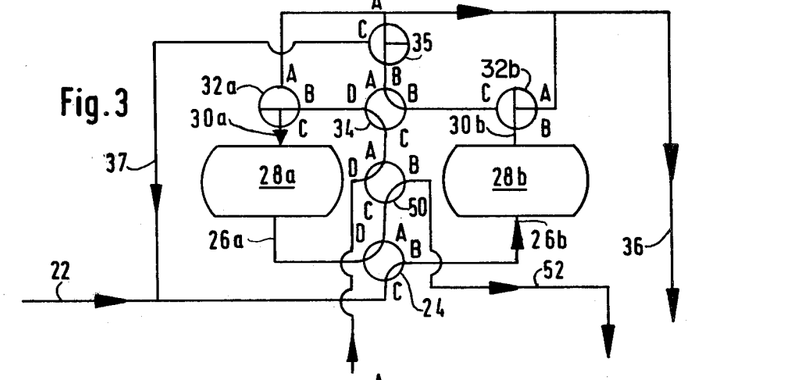
FIG. 3 is a schematic view of a portion of the apparatus of FIG. 1 in the operating state, in which the first adsorbent vessel is switched to desorption and the second vessel is switched to adsorption.
Figure 4:
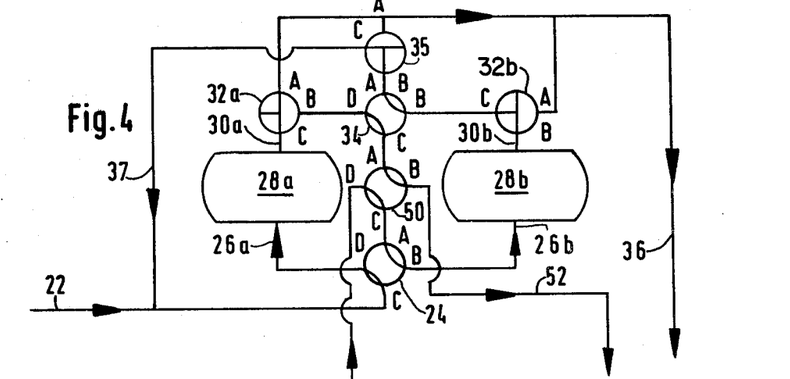
FIG. 4 is a schematic view of a portion of the apparatus of FIG. 1 in the operating state, in which the first adsorbent vessel is switched to adsorption and the second vessel is inerted.

The exhaust air laden with solvent vapors flows via duct 22 to valve 24 and, according to the position of this valve, either via inlet duct 26a into adsorbent vessel 28a (valve position C-D as shown in FIGS. 1 and 4) or via inlet duct 26b into adsorbent vessel 28b (valve position C-B as shown in FIGS. 2 and 3).

Adsorbent charge in vessel 28a adsorbs the solvent vapors contained in the exhaust air and the exhaust air lean in solvent vapors flows, in the operating position shown in FIG. 1, via outlet duct 30a, valve 32a (position C-B) and valves 34 (position D-A) and 35 (position B-A) into outlet duct 36 and then either directly via by-pass valve 38 or through heat exchanger 40 (the mode of operation of which is described below) out into the atmosphere.

Solvent vapor detectors can be built into the outlet ducts 30a or 30b and used for automatic control of the corresponding valves on breakthrough of solvent vapors. Oxygen detectors can further be provided in outlet ducts 30a and 30b, which likewise control the valves and whose mode of operation is further described below.

In the operating state shown in FIG. 1, the adsorbent charge in adsorbent vessel 28b is being desorbed by means of an inert gas stream conducted therethrough via the inert gas circuit. A strongly cooled inert gas stream 42, lean in solvent vapors, is first heated by two heat exchangers 44 and 46, the mode of operation of which is further described below, and then flows through a heating register 48 in which it is heated to the required desorption temperature. After the heating register, the inert gas stream flows through valve 50 (position D-C) and valve 24 (position A-B), through inlet duct 26b into adsorbent vessel 28b, the adsorbent charge of which is laden with solvent. There it becomes laden with solvent vapor and flows via duct 30b and valves 32b (position B-C), 34 (position B-C) and 50 (position A-B) into duct 52.

A solvent vapor detector (not shown) in duct 30b indicates the end of desorption and controls the corresponding valves. A stop valve 54 is located between ducts 42 and 52; it is closed in the operating state shown, and is opened when no adsorbent vessel is in the inert gas circuit (e.g., when the lacquering plant is out of operation, or when a repair is needed in the region of the adsorbent vessels), so that the remainder of the system always remains inerted (referred to as the minor inert gas circuit).

The hot inert gas laden with solvent vapors then flows through heat exchanger 40 and is thus cooled by indirect heat exchange with the cold exhaust air from duct 36.

Part of the solvent vapors may already condense after heat exchanger 40, since the inert gas laden with solvent vapors is now at about the temperature of the cold exhaust air. This condensate portion can be separated in solvent separator 56 (shown dashed).

The inert gas stream, still laden with solvent vapors, is then compressed in the first compressor 58. Compressor 58 is coupled (if necessary via gearing, not shown) to an external work machine, e.g., an electric motor 60. The power input of compressor 58 is controllable, e.g., via the rpm of the motor 60 or via gearing, so that the pressure and hence also the temperature of the inert gas stream laden with solvent vapors can be set in dependence on the solvent being used and the desired final concentration of solvent vapors.

The inert gas stream compressed by means of compressor 58 flows through heat exchanger 46 and gives up its heat to the cold inert gas stream lean in solvent vapors. Heat exchanger 46 can be bridged over via by-pass valve 62, which offers a further possibility of temperature control of the inert gas stream.

As a result of the cooling of the inert gas stream in heat exchanger 46, a further part of the solvent vapors can condense and be separated as condensate in solvent separator 64 (shown dashed).

The compressed inert gas stream, still containing the major part of the solvent vapors, now flows through the intermediate cooler 66, which can, if necessary be followed again by a solvent separator 68 (shown dashed). The compressed inert gas stream still containing the major part of the solvent vapors is now further compressed in a second compressor 70 and again heated. It gives up its heat, in heat exchanger 44, to the cold inert gas stream 42 lean in solvent vapors. After heat exchanger 44, a solvent separator 72 can be provided, in which a further fraction of the solvent vapors is separated.

The second compressor 70 is directly coupled mechanically to an expansion turbine 74, via shaft 76, and obtains the energy necessary for its operation from the work furnished in expansion turbine 74 by the compressed inert gas. This cools the inert gas stream strongly so that practically all of the solvent vapors contained in the inert gas stream condense and can be separated in solvent separator 78 following the expansion turbine 74. The expansion turbine 74 is shown as a single-stage expansion turbine. A multi stage expansion turbine can also be used, with solvent separators inserted between the individual expansion stages. In this manner a fractional condensation of the solvent vapors can be effected and substantially pure solvent fractions can be obtained. A certain degree of fractionation, however, is already obtained by use of the previous solvent separators 56, 64, 68 and 72. It is of particular importance when low-boiling solvents are used for the water vapor contained in the inert gas stream to be already, to a large extent, condensed and separated in the first stage, so that contamination of the organic solvent with water and icing up of the ducts and damage to the blades of the expansion turbine by ice crystals may be avoided.

After desorption of the adsorbent change in the adsorbent vessel 28b has ended, the adsorbent vessels 28a and 28b are changed over by actuation of the necessary valves. This changeover can occur automatically, in that either the solvent vapor detector in outlet duct 30a registers breakthrough of solvent vapor or the solvent vapor detector in outlet duct 30b registers the absence of solvent vapor and actuates the necessary valves. In general, desorption takes place more rapidly than adsorption, and it can be appropriate to maintain the inert gas circuit through adsorbent vessel 28b for a certain time after the solvent vapor concentration falls in outlet duct 30b, but to no longer heat the inert gas stream flowing through duct 42 in order to reduce the temperature of the adsorbent charge in vessel 28b to the optimum adsorption temperature. The heating register 48 can be switched off for this purpose. Further, the feed of coolant into cooler 66 can be increased, and that portion of the inert gas circuit consisting of the second compressor 70, heat exchanger 44, and the expansion turbine 74 can be shut down by opening by-pass valve 80, with the first compressor 58 being simultaneously run at lower power.

Changeover of adsorbent vessel 28a to desorption and of adsorbent vessel 28a to adsorption takes place in the following manner, as shown in FIGS. 2 and 3.

Valve 24 is changed over to position C-B, so that the exhaust air stream laden with solvent vapors (via duct 22) flows through inlet duct 26b into adsorbent vessel 28b. Valve 32b is changed over to position B-A, so that the exhaust air stream freed of solvent vapors is adsorbent vessel 28b and still containing inert gas can pass via duct 36 into the atmosphere. Valve 35 is changed over to position B-C.

On changeover of valve 24, path A-D is simultaneously opened, so that the inert gas stream 42 lean in solvent vapors and not yet heated, can flow through inlet duct 26a into adsorbent vessel 28a. Adsorbent vessel 28a, however, still contains oxygen-containing exhaust air which contaminates the inert gas stream, so that the gas mixture in the initial stage of desorption cannot be returned to the inert gas circuit. Hence, this gas mixture is conducted back via outlet duct 30a, valve 32a (C-B), valve 34 (D-A), valve 35 (B-C) and duct 37 into exhaust air duct 22, through which the gas mixture is conducted, together with fresh exhaust air, into adsorbent vessel 28b. The solvent vapors contained in the gas mixture from duct 37 are also removed in this way.

After the adsorbent vessel 28a is sufficiently inerted (as can be determined by means of an oxygen detector in outlet duct 30a), valves 50, 34 and 35 are changed over, as shown in FIG. 3. In this case the flow path of the exhaust air stream 22 is unchanged. Valve 35 is changed to position B-A. The inert gas stream now flows via valve 50 (D-A), valve 34 (C-D) and valve 32a (B-C) in the reverse direction through outlet duct 30a and into adsorbent vessel 28a, and also through inlet ducts 26a, valve 24 (D-A) and valve 50 (C-B) into duct 52 and thus back into the inert gas circuit.

At this stage the heating register 48 and also, by closing by-pass valve 80, that portion of the inert gas circuit consisting of the second compressor 70, heat exchanger 44, and the expansion turbine 74, is switched in again, the power supplied to the first compressor 58 being simultaneously increased.

After the solvent adsorbed on the adsorbent charge in vessel 28a has been desorbed, as can be detected by means of a solvent vapor detector in inlet duct 28a, the heating register 48 is switched off, by-pass valve 80 is opened, and the first compressor 58 is driven at reduced power. Valve 24 is then changed over such that the exhaust air laden with solvent vapors can flow through adsorbent vessel 28a, which has been cooled in the meantime, via position C-D and duct 26a (FIG. 4). Valve 32a is in position C-A, so that the exhaust air stream lean in solvent vapors can reach the atmosphere via duct 36. The inert gas stream at first passes through valve 50 (changed to position D-C), then through valve 24 (position A-B) and through duct 26b into the adsorbent vessel 28b, where practically no desorption takes place as the inert gas stream is still cold. The inert gas stream, at first still contaminated with exhaust air, flows from adsorbent vessel 28b through outlet duct 30b, valve 32b (changed to position B-C), valve 34 (B-A) and valve 35 (changed to position B-C) and via duct 37 into duct 22, and thence together with the fresh exhaust gas through valve 24 (C-D) and inlet duct 26a through adsorbent vessel 28a.

When the oxygen detector in outlet duct 30b no longer detects oxygen, valve 34 is changed over into position B-C (FIG. 1), so that adsorbent vessel 28b again lies in the inert gas circuit. Vavle 35 is simultaneously changed over into position B-A, while valve 32a is changed over to position C-B, so that the exhaust air freed of solvent vapor can flow from adsorbent vessel 28a via duct 36 into the atmosphere.

After heating register 48 is switched off, closing of by-pass valve 80 again begins the loading of the adsorbent charge in adsorbent vessel 28a and desorption of the adsorbent charge in adsorbent vessel 28b, as described above with reference to FIG. 1.

To compensate for inert gas losses in operation, particularly arising from inerting of adsorbent vessel 28a and 28b, an inert gas source, for example, a nitrogen pressure container, is inserted at a given point of the inert gas duct 42 or 52 (before heat exchanger 40 in the embodiment shown in FIG. 1). Infeed of the inert gas can be controlled by oxygen detector 84, which controls valve 86.

The inert gas source 82 also serves to inert the inert gas circuit before starting the plant up. For this purpose, valve 86 is opened and stop valve 54 is closed, so that at first still contaminated inert gas is let out into the atmosphere by means of compressor 58, driven at low power, via ducts 52 and 42 and also through the equipment parts contained in them, e.g., through valves 50 (D-A), 34 (C-B) and 30b (C-A).

Figure 5:
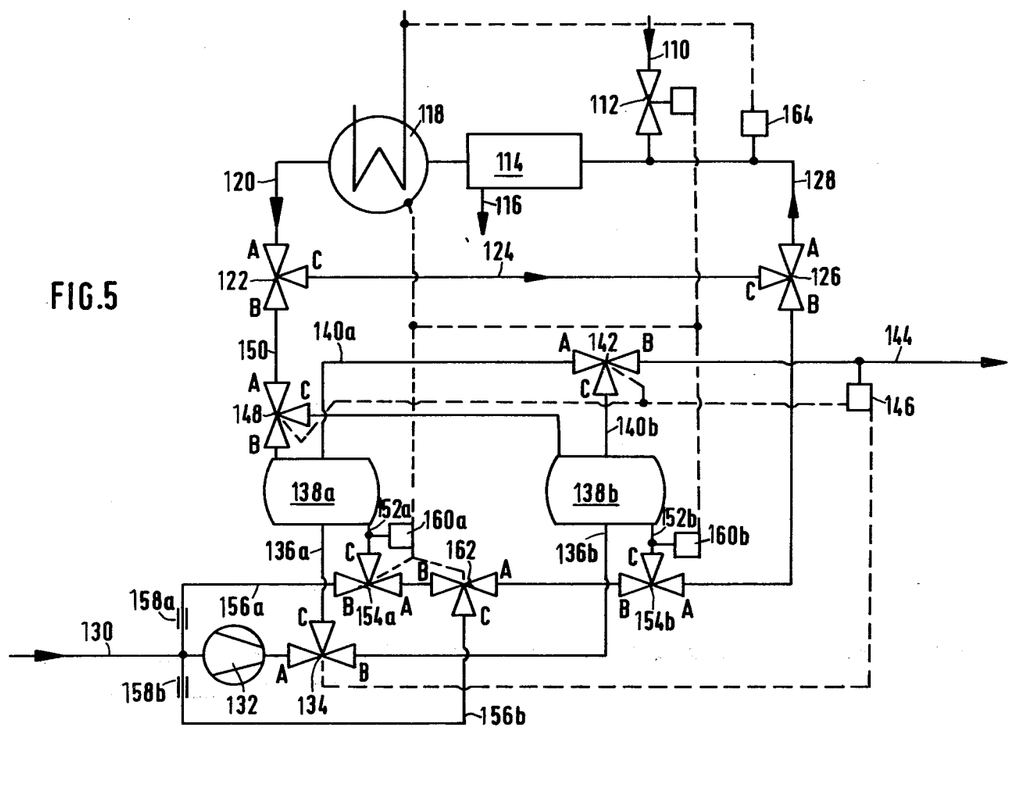
FIG. 5 is a schematic view of a solvent recovery apparatus in accordance with the second embodiment of the present invention.

An apparatus for the recovery of solvents according to the second embodiment of the present invention is described below with reference to FIG. 5. The apparatus shown in FIG. 5 can be operated with or without the expansion turbine 74 shown in FIG. 1.

When the apparatus is started up, the small inert gas circuit is first actuated by opening control valve 112 in the inert gas duct 110. The inert gas duct 110 leads to an inert gas source (not shown), e.g., a nitrogen pressure container. Control valve 112 can be automatically opened when losses of inert gas arise during operation of the apparatus, as further explained below.

The inert gas stream flows from control valve 112 through a condensation part, schematically denoted by 114, the substantial elements of which consist of a cooling apparatus and a solvent separator. The cooling apparatus appropriately represents, as described above in more detail in connection with FIGS. 1-4, a combination of one or more compressors with an expansion turbine, and with coolers or heat exchangers provided between the compressor and the expansion turbine or between the individual compressors.

The solvent condensed in the condensation part 114 during operation of the apparatus is drawn off via a solvent outlet duct 116; when a fractionated desorption is effected, the individual solvent fractions are conducted into different collecting containers (not shown).

A heating register 118 adjoins the condensation part 114 by which the inert gas is heated to the required desorption temperature.

In inerting the small inert gas circuit, however, the heating register 118 and the condensation part 114 are switched off. The inert gas, at first still contaminated with air, flows via duct 120, valve 122 (position A-C), and by-pass duct 124 to valve 126. Valve 126 is at first open on all sides (A-B-C), since the inert gas return duct 128 must also first be inerted. Thus a partial inert gas stream first flows also in the reverse direction through duct 128 and valve 126. There it unites with the main inert gas stream from duct 124 and flows with it at B from valve 126 on any path into the atmosphere. The small inert gas circuit can, of course, also be constructed in the reverse manner, i.e., the positions A and C of valve 126 are open while valve 122 is open in all three positions and the inert gas at first contaminated with air is passed via position B into the atmosphere after it has previously been used still in the appropriate circumstances for inerting an adsorbent vessel.

After displacement of the air, control valve 112 is closed, and valves 122 and 126 are respectively brought into the position A-C. The small inert gas circuit shown by the arrow in ducts 120, 124 and 128 is formed when a compressor contained in the condensation part 114 is operated at low power to function as an inert gas pump.

The loading of one of the two adsorbent vessels with solvent takes place simultaneously with the formation of the inert gas circuit. The solvent-laden exhaust air, which can come, e.g., from the lacquering plant shown in FIG. 1, enters the system via duct 130 and is passed by means of the exhaust air fan 132 through control valve 134 (position A-C) and duct 136a into adsorbent vessel 138a. The adsorbent charge in vessel 138a adsorbs the solvent vapors contained in the cold exhaust air, and the exhaust air lean in solvent vapors flows via outlet duct 140a and valve 142 (position A-B) via outlet duct 144 into the atmosphere. A solvent vapor detector 146 is located in outlet duct 144 and controls valves 134, 142, and 148 on breakthrough of the solvent vapors. The corresponding control paths are schematically indicated by dashed lines between the vapor detectors 146 and the valves.

Valve 134 is first changed over into position A-B, so that the exhaust air laden with solvent vapors is conducted via inlet duct 136b into adsorbent vessel 138b. Valve 142 is simultaneously changed over into position C-B, so that the exhaust air stream depleted of solvent vapors can flow out through outlet duct 144 into the atmosphere.

Inerting of adsorbent vessel 138a begins simultaneously with the beginning of the loading phase in adsorbent vessel 138b. For this purpose, control valve 112 is opened and the inert gas flows through duct 120 to valve 122 which is open in position A-B. Position C is partially open, so that a position of the inert gas flows back through the by-pass duct 124 and via valve 126 (position C-A) into the inert gas return duct 128.

The main part of the inert gas passes via duct 150 and control valve 148 (position A-B) into adsorbent vessel 138a, where it displaces the exhaust air. Mixed with the exhaust air, the inert gas now flows through duct 152a into valve 154a (position C-B) and out from there through duct 156a into the exhaust air duct 130. To prevent backflow of exhaust air from duct 130 into duct 156a, a throttle 158a is arranged in duct 156a.

In duct 152a there is arranged an oxygen detector 160a which passes a control signal (via the dashed lines) to valves 112, 154a and 162 when the oxygen concentration falls below the maximum permissible value. When this occurs, valve 112 is closed, and the inert gas stream is conducted via valves 154a (position C-A), 162 (position B-A), and 154b (B-A), and also via valve 126 (B-A) into the inert gas return duct 128. A large inert gas circuit is thus formed.

For desorption of the adsorbent in adsorbent vessel 138a, the heater 118 is switched on. This can likewise be controlled by the oxygen detector 160a.

The adsorbent in adsorbent vessel 138a is desorbed by the hot inert gas stream, and the inert gas stream laden with solvent vapors flows through valves 154a (C-A), 162 (B-A), 154b (B-A), and 126 (B-A) and also through return duct 128 into the condensation part 114, the compressor of which is now driven at full power. The solvent vapors condense because of the compression and following expansion, and the solvent condensate is drawn off at 116. The inert gas stream, now freed of solvent vapors, is returned to adsorbent vessel 138a.

After desorption of the adsorbent charge in adsorbent vessel 138a, as can be detected, for example, by means of a solvent vapor detector 164 arranged in duct 128, adsorbent vessels 138a and 138b are changed over by actuation of the necessary valves. This changeover can be effected automatically by means of vapor detector 164. Since desorption is in general faster than adsorption, it can be appropriate to maintain the inert gas circuit as it is for a given time after the solvent vapor in the inert gas return duct 128 has decreased. The heater 118 is first switched off, by means of detector 164, for example, by the detector shutting off, via corresponding switching elements, a hot steam duct to the heater 118. Furthermore, the coolant fed into the condensation part 114 can be increased, and the compressor can be driven at a lower power.

Changeover occurs after the adsorbent vessel 138a has cooled to about the temperature of the surroundings. This changeover can likewise be effected automatically by temperature sensors (not shown). For this purpose, valve 134 is moved to position A-C, and the exhaust air laden with solvent vapors flows via duct 136a into the cooled adsorbent vessel 138a. The exhaust air stream freed from solvent vapors and at first still containing inert gas is conducted from adsorbent vessel 138a via duct 140a and valve 142 (position A-B) and also duct 144 into the atmosphere.

Valve 148 is changed over into position A-C simultaneously with changeover of valves 134 and 142, and the still cold inert gas stream is conducted for inerting into adsorbent vessel 138b. From vessel 138b it flows via duct 152b and valves 154b (position C-B) and 162 (position A-C) into duct 156b and through throttle 158b into the exhaust air duct 130.

The inert gas stream contaminated with exhaust air and solvent vapors is there united with the exhaust air laden with solvent vapors and together conducted into adsorbent vessel 138a.

In order to compensate for the losses of inert gas thus arising, valve 112 is opened for a period until adsorbent vessel 138b is sufficiently inerted, which can be detected by means of the oxygen detector 160b. Oxygen detector 160b closes valve 112 and brings valve 154b into position C-A and valve 126 into position B-A, via corresponding control elements, so that the large inert gas circuit is formed through absorbent vessel 138b. Then the heater 118 is switched on by means of oxygen detector 160b, and the condensation part 114 is set in operation, so that desorption of the adsorbent charge contained in adsorbent vessel 138b can take place, with loading of the adsorbent charge in adsorbent vessel 138a taking place simultaneously.

After desorption of the adsorbent charge in vessel 138b has ended, vessel 138b is cooled by switching off the heater 118 via solvent vapor detector 164. After cooling vessel 138b is changed over to adsorption by a corresponding changeover of valves 134, 142, and 148 in the manner described above, while adsorbent vessel 138a is first inerted by a changeover of valves 148 and 154a and then changed over to desorption by a changeover of valves 162 and 154b.

This changeover can be repeated arbitrarily often. Because of the described control mechanism, the process can operate substantially automatically, and the optimal changeover times can be precisely determined so that the inert gas losses due to operation can also be kept low.

Furthermore, the process control according to the invention prevents solvent vapors and other condensible, injurious materials from entering the atmosphere.

Although the invention has been described with reference to the preferred embodiments, it is to be limited only so far as is set forth in the accompanying claims.

I claim:

1. A process for recovering solvents which are adsorbed by an adsorbent from exhaust air containing solvent vapors, said process including the steps of passing a hot stream of inert gas as the desorption medium from an inert gas circuit through the adsorbent, cooling the stream of inert gas to condense the solvent vapors picked up by the stream of inert gas, separating the solvent condensate, and re-using the reheated stream of inert gas, low in solvent vapors, as the desorption medium, the improvement comprising:

the steps of compressing the inert gas stream laden with the solvent vapors and cooling the inert gas stream laden with solvent vapors in an expansion turbine while delivering work from the expansion chamber, wherein both steps condense the solvent vapors.

2. The process of claim 1, further including the step of cooling the inert gas stream laden with solvent vapors before compressing.

3. The process of claim 2, wherein the work delivered by the expansion turbine is directly used to compress the inert gas stream laden with solvent vapors.

4. The process of claim 3, wherein the inert gas stream laden with solvent vapors is compressed in at least two stages and is cooled in at least one intermediate stage.

5. The process of claim 4, wherein the last compression stage operates while mechanically coupled to the expansion turbine and the remaining compression stages operate with externally supplied work.

6. The process of claim 5, further including the step of cooling the inert gas stream laden with solvent vapors in an indirect heat exchanger with exhaust air lean in solvent vapors.

7. The process of claim 6, further including the step of indirectly cooling the compressed inert gas stream laden with solvent vapors with the cooled inert gas stream lean in solvent vapors.

8. The process in claims 1 or 7, further including the steps of passing the hot inert gas stream lean in solvent vapors alternatingly through at least two adsorbent charges laden with solvents and removing the adsorbent charge depleted of solvent due to desorption from the inert gas circuit and loading the depleted adsorbent charge with solvent from the cold exhaust air laden with solvent vapors.

9. The process of claim 8, further including the step of removing that part of the hot inert gas stream contaminated by the exhaust air during circulation in the initial phase of desorbing the one adsorbent charge and passing said contaminated stream into the adsorbent charge depleted of solvent.

10. A process for the recovery of solvents adsorbed by an adsorbent from exhaust air containing solvent vapors, said process including the steps of displacing the exhaust air surrounding the adsorbent, passing alternatingly through two adsorbent charges laden with solvent a hot stream of inert gas low in solvent vapors and acting as a desorption medium, cooling the stream of inert gas to condense the solvent vapors picked up by the stream of inert gas, separating the solvent condensate, heating and re-using the stream of inert gas low in solvent vapors for desorption, removing the particular adsorbent charge depleted of solvent due to desorption from the inert gas stream circulation, and passing the exhaust air laden with solvent vapors through said adsorbent charge depleted of solvent, the improvement comprising:
measuring the oxygen concentration of the stream of inert gas contaminated with exhaust air at the beginning of the desorption phase, passing said contaminated stream of inert gas before it drops below a maximally admissible oxygen concentration into the other adsorbent charge depleted of solvent, and switching the adsorbent charge laden with solvent back into the inert gas stream circulation only after said oxygen concentration drops below the maximally admissible level.

11. The process of claim 10, wherein at the beginning of the desorption phase the inert gas stream is introduced into the adsorbent charge depleted of solvent at a temperature lower than that required for desorption.

12. The process of claim 11, wherein the required temperature of desorption is automatically set after the oxygen concentration drops below the maximally admissible level.

13. The process of claim 12, further including the step of performing a fractionated desorption by raising the temperature of desorption stepwise when recovering a mixture of solvents.

14. The process of claim 13, wherein the stepwise increase in the temperature of desorption is carried out automatically.

15. The process of claim 13, further including the step of measuring, in the desorption phase, the concentration of the solvent vapor in the stream of inert gas that was made to pass through the adsorbent charge and initiating the loading phase after a predetermined concentration value has been reached.

16. The process of claim 15, wherein the temperature of the adsorbent charge is automatically lowered on initiation of the loading phase.

17. Apparatus for the recovery of solvents containing at least one adsorbent vessel with inlet and outlet ducts for alternatingly transmitting a cold stream of exhaust air laden with solvent vapors and a stream of inert gas lean in solvent vapors, at least one cooling means connected to the outlet duct of the inert gas stream which was laden in the adsorbent vessel with solvent vapors, at least one solvent separator following the cooling means, and at least one heating means following the last solvent separator and connected to the inlet duct to the adsorbent vessel for heating the cooled stream of inert gas lean in solvent vapors, the improvement comprising:
an expansion turbine in the outlet duct of the inert gas stream laden with solvent vapors, said expansion turbine preceded by at least one compressor.

18. Apparatus of claim 17, wherein the cooling means precede the expansion turbine.

19. Apparatus of claim 18, wherein the expansion turbine is mechanically coupled to a compressor.

20. Apparatus of claim 19, wherein at least two compressors are provided and further comprising an intermediate cooler between adjacent compressors.

21. Apparatus of claim 20, wherein one compressor is coupled directly and mechanically to the expansion turbine and the remaining compressors are each coupled to an external work machine.

22. Apparatus of claim 21, further comprising an indirect heat exchanger inserted into the hot flow of inert gas laden with solvent vapors and crossed by the cold exhaust air low in solvent vapors.

23. Apparatus of claim 22, further comprising a heat exchanger inserted into the stream of inert gas laden with solvent vapors between the expansion turbine and the adjacent compressor for the purpose of reheating the stream of inert gas, said heat exchanger crossed by the stream of inert gas lean in solvent vapors.

24. Apparatus of claims 17 or 23, including at least two adsorbent vessels of which, alternatingly, the one of which the adsorbent is laden with solvent is inserted into the inert gas stream lean in solvent vapors, and of which the other of which the adsorbent is depleted of solvent is removed from the inert gas stream and is inserted into a cold stream of exhaust gas laden with solvent vapors.

25. Apparatus of claim 24, wherein one adsorbent vessel is provided with an outlet duct leading to the other adsorbent vessel by means of which said outlet duct part of the inert gas flow stream containing solvent vapors and contaminated by the exhaust air is made to pass at the beginning of desorption into the other adsorbent vessel.

26. Apparatus for the recovery of solvents including two adsorbent vessels, means for, alternatingly, inserting the first vessel, of which the adsorbent is laden with solvent, into the inert gas stream lean in solvent vapors and removing the second adsorbent vessel, of which the adsorbent is depleted of solvent, from the inert gas circuit, means for inserting said second vessel into a stream of cold exhaust air laden with solvent vapors, cooling means followed by solvent separators for removing the solvent vapors contained in the flow of inert gas downstream of the first adsorbent vessel, heating means after the solvent separator and connected to the inlet duct to the first adsorbent vessel for reheating the cooled stream of inert gas lean in solvent vapors, oxygen and solvent vapor detectors in the adsorbent vessel outlet ducts crossed by the exhaust air and by the inert gas, respectively, which detectors are connected to means for controlling switch-over valves for heating the inert gas stream and switch means for cooling the inert gas stream, respectively, and an inert gas source connected to the inert gas circuit to compensate for operational inert gas losses, the improvement comprising:

providing the first adsorbent vessel with an outlet duct leading to the second adsorbent vessel, whereby part of the inert gas stream containing solvent vapors and contaminated by the exhaust air is passed only for a short time period starting at the beginning of the desorption phase through said outlet duct into the second adsorbent vessel.

27. Apparatus for claim 26, further comprising an oxygen detector in the outlet duct of each adsorbent vessel for controlling the inert gas source.

* * * * *

UNITED STATES PATENT AND TRADEMARK OFFICE
CERTIFICATE OF CORRECTION

PATENT NO. : 4,414,003

DATED : November 8, 1983

INVENTOR(S) : Bernd Blaudszun

It is certified that error appears in the above-identified patent and that said Letters Patent are hereby corrected as shown below:

In the Abstract - Line 5 "absorbent" should read --adsorbent--.

Column 2 Line 2 "steam" should read --stream--.

Column 2 Line 22 "will" should read --with--.

Column 3 Line 28 "stream" should read --steam--.

Column 3 Line 59 "cooling" should read --coupling--.

Column 10 Line 6 "change" should read --charge--.

Column 11 Line 5 "28a" should read --26a--.

Column 11 Line 29 "Vavle" should read --Valve--.

Column 13 Line 2 "position" should read --portion--.

Column 14 Line 12 "absorbent" should read --adsorbent--.

Claim 8 - Column 15 Line 11 "in" should read --of--.

Signed and Sealed this

Twelfth Day of June 1984

[SEAL]

Attest:

GERALD J. MOSSINGHOFF

Attesting Officer     Commissioner of Patents and Trademarks